United States Patent
Minshull

(10) Patent No.: US 10,064,401 B1
(45) Date of Patent: Sep. 4, 2018

(54) FISHING HOOK PACKAGING SYSTEM

(71) Applicant: Warren Evans Minshull, Gulf Breeze, FL (US)

(72) Inventor: Warren Evans Minshull, Gulf Breeze, FL (US)

( * ) Notice: Subject to any disclaimer, the term of this patent is extended or adjusted under 35 U.S.C. 154(b) by 270 days.

(21) Appl. No.: 15/017,641

(22) Filed: Feb. 7, 2016

(51) Int. Cl.
*A01K 97/06* (2006.01)

(52) U.S. Cl.
CPC .................... *A01K 97/06* (2013.01)

(58) Field of Classification Search
CPC ................ A01K 97/06; B65D 85/24
USPC ........... 43/57.1, 54.1, 57.2; 206/315.11, 380; 224/920
See application file for complete search history.

(56) References Cited

U.S. PATENT DOCUMENTS

| | | | | |
|---|---|---|---|---|
| 652,901 A * | 7/1900 | Roeber | ............ | A61M 15/0045 206/380 |
| 726,509 A * | 4/1903 | Connor | .................. | A01K 97/06 43/57.1 |
| 940,132 A * | 11/1909 | Creasey | ................. | A01K 97/06 43/57.1 |
| 1,824,481 A * | 9/1931 | Hazlitt | .................... | A01K 97/06 206/315.11 |
| 2,232,873 A * | 2/1941 | Storms | ............... | B65D 5/48018 206/227 |
| 2,268,920 A * | 1/1942 | Baumgartner | ......... | A01K 97/06 43/57.1 |
| 2,422,870 A * | 6/1947 | Willis | .................... | A01K 97/06 206/315.11 |
| 2,541,920 A * | 2/1951 | Hammock | ............. | A01K 91/18 43/57.3 |
| 2,614,359 A * | 10/1952 | Galbraith | ............... | A01K 97/06 43/57.1 |
| 2,682,126 A * | 6/1954 | Shepherd | ............... | A01K 91/04 223/99 |
| 2,804,716 A * | 9/1957 | Adkison | ................. | A01K 91/18 43/57.3 |
| 2,838,868 A * | 6/1958 | Young | .................... | A01K 97/06 43/57.2 |

(Continued)

FOREIGN PATENT DOCUMENTS

| | | | | |
|---|---|---|---|---|
| FR | 2578716 A1 * | 9/1986 | ............. | A01K 97/06 |
| GB | 331741 A * | 7/1930 | ............. | A01K 97/06 |

(Continued)

OTHER PUBLICATIONS

Translation of JP2008-306971.*

*Primary Examiner* — Darren W Ark
(74) *Attorney, Agent, or Firm* — Peter Loffler

(57) ABSTRACT

A packaging system for fishing hooks and other items having an eye, such as a needle. A backing member has a flexible and transparent cover hingedly attached to the backing member along an edge of each item. A flexible and resilient line passes through one or two openings on the backing member such that a bulbous loop is formed on one side of the backing member. The held items are fed onto the line via the each item's eye and the items held between the bulbous loop and the backing member such that the bulbous loop prevents the items' discharge from the line. When the bulbous loop is squeezed, it becomes flattened allowing the items to slide off of the line in orderly fashion. When the bulbous loop is no longer squeezed, it resiliently returns back to its bulbous state.

11 Claims, 5 Drawing Sheets

(56) References Cited

U.S. PATENT DOCUMENTS

| | | | | |
|---|---|---|---|---|
| 2,904,925 A * | 9/1959 | Clark | A01K 97/06 | 43/57.1 |
| 3,004,319 A * | 10/1961 | Hennon | A01K 97/06 | 24/598.5 |
| 3,005,574 A * | 10/1961 | Lovell | A01K 97/06 | 221/310 |
| 3,122,854 A * | 3/1964 | Boertlein, Sr. | A01K 97/06 | 43/57.1 |
| 3,180,487 A * | 4/1965 | Uddenborg | B65D 83/00 | 206/227 |
| 3,206,068 A * | 9/1965 | McQuillin | A01K 97/06 | 206/315.11 |
| 4,034,850 A * | 7/1977 | Mandel | A61B 17/06138 | 206/227 |
| 4,179,834 A * | 12/1979 | Thomas | A01K 97/06 | 43/57.2 |
| 4,326,630 A * | 4/1982 | Bacino | A61B 17/06133 | 206/315.11 |
| 4,414,771 A | 11/1983 | Martin | | |
| 4,424,898 A * | 1/1984 | Thyen | A61B 17/06133 | 206/380 |
| 4,546,569 A * | 10/1985 | Thompson, Jr. | A01K 91/18 | 43/57.3 |
| 4,577,433 A * | 3/1986 | Jones | A01K 97/06 | 43/57.2 |
| 4,802,581 A * | 2/1989 | Takahashi | A41H 19/00 | 206/380 |
| 5,345,709 A | 8/1994 | Cummings et al. | | |
| 5,438,791 A * | 8/1995 | Sherrod | A01K 97/06 | 43/57.1 |
| 5,524,385 A * | 6/1996 | Longo | A01K 83/00 | 43/43.16 |
| 5,647,616 A | 7/1997 | Hamilton | | |
| 5,806,236 A * | 9/1998 | Lloyd | A01K 97/06 | 43/57.1 |
| 5,875,585 A * | 3/1999 | Schreifels | A01K 91/14 | 43/44.98 |
| 6,036,051 A * | 3/2000 | Benjamin | A01K 97/06 | 221/185 |
| 6,101,760 A | 8/2000 | Garman | | |
| 6,889,469 B1* | 5/2005 | Chung | A01K 97/06 | 43/57.1 |
| 7,159,356 B2* | 1/2007 | Westcott | A01K 97/06 | 43/25.2 |
| 7,380,367 B1* | 6/2008 | Andrews | A01K 97/06 | 43/57.1 |
| 7,513,076 B1* | 4/2009 | Gehrts | A01K 97/06 | 206/315.11 |
| 7,900,392 B2* | 3/2011 | Musto | A01K 97/06 | 206/315.11 |
| 2007/0051032 A1* | 3/2007 | Moffitt | A01K 97/06 | 43/54.1 |
| 2013/0008076 A1* | 1/2013 | Stenklyft | A01K 91/04 | 43/44.83 |

FOREIGN PATENT DOCUMENTS

| | | | | |
|---|---|---|---|---|
| GB | 945377 A * | 12/1963 | | A01K 91/04 |
| GB | 2274966 A * | 8/1994 | | A01K 89/00 |
| JP | 08023848 A * | 1/1996 | | |
| JP | 08047360 A * | 2/1996 | | |
| JP | 09056315 A * | 3/1997 | | |
| JP | 09275869 A * | 10/1997 | | |
| JP | 11266765 A * | 10/1999 | | |
| JP | 2001247138 A * | 9/2001 | | |
| JP | 2003250411 A * | 9/2003 | | |
| JP | 2004313067 A * | 11/2004 | | |
| JP | 2005065584 A * | 3/2005 | | |
| JP | 2005104571 A * | 4/2005 | | |
| JP | 2005185136 A * | 7/2005 | | |
| JP | 2006034203 A * | 2/2006 | | |
| JP | 2006180858 A * | 7/2006 | | |
| JP | 2007289072 A * | 11/2007 | | |
| JP | 2008306971 A * | 12/2008 | | |
| JP | 2010252717 A * | 11/2010 | | |
| WO | WO-03063627 A1 * | 8/2003 | | A01K 97/06 |
| WO | WO-2011092925 A1 * | 8/2011 | | A01K 97/06 |

\* cited by examiner

FISHING HOOK PACKAGING SYSTEM

BACKGROUND OF THE INVENTION

1. Field of the Invention

The present invention relates to a packaging system that holds fishing hooks in an orderly linear manner and assists in threading the eye of the hook onto a fishing line whenever a fishing hook is retrieved from the packaging system.

2. Background of the Prior Art

Fishing is one of life's great past times. Jump into a boat or sit on a dock or simply a shoreline, cast a line, and wait for dinner to come biting, all while enjoying a beer or other refreshment. It simply does not get much better than that, adding support to the old saying that a bad day at fishing is better than a good day at work.

One of the main paraphernalia items used during fishing is the old fashioned hook. The hook has an eyelet end which is attached to the fishing rod's line and a barbed or hooked end that is used to hook the fish that comes biting for the bait on the hook. Fishing hooks run the gamut from the simple to the elaborate, but they all have one trait in common, the hooked end is very sharp and very painful if it hooks a person on a body part. Hooks may be sold individually or in multipacks, often loosely packed together in plastic containers or bags, and irrespective of how they are sold, many fishermen simply throw a bunch of them into a container and retrieve one as each is needed.

When the fishing hooks are lumped in a container, which can be anything from a used medication container, to a Tupperware tub, to a tool box, the hooks tend to get jumbled about, often becoming entangled with one another. When a person seeks to retrieve a hook, the person must often untangle a desired hook from the tangled lump of fishing hooks. Even the most careful of fishermen will get stuck with a hook from time to time, adding a rousing dose of pain to the fishing experience.

To address this problem, many fishermen package each hook individually, such as by placing a single hook into a small container and then placing a multitude of such small containers into a larger container or alternately, using a storage box with multiple individual compartments with a single hook being placed into each compartment. While each system is effective in reducing the potential for being painfully hooked, these methods of hook storage often takes up too much of the limited storage space a person has for all of the needed supplies for the day. Additionally, this method is time-consuming to implement and many fishermen simply take their chances and simply hope the day's blood draw is kept to a minimum.

What is needed is a device that holds a plurality of fishing hooks in a neat and orderly manner so as to allow a user to be able to retrieve a single hook for use without fear of the user getting hooked. Such a device must be of relatively simple design and construction and must be compact in its footprint.

SUMMARY OF THE INVENTION

The fishing hook packaging system of the present invention addresses the aforementioned needs in the art by providing a device that holds a plurality of fishing hooks in a neat and orderly fashion and prevents the hooks from becoming entangled with one another. The fishing hook holder allows a user to dispense a single hook with minimum fear of being hooked by the hooks being held by the device with the added benefit of the device assisting the user in threading the hook onto the end of a fishing line. Retrieval of fishing hooks from the fishing hook packaging system is relatively simple. The fishing hook packaging system is of relatively simple design and construction, being produced using standard manufacturing techniques, so as to make the device relatively inexpensive to produce so as to be economically attractive to potential consumers for this type of device. The present invention is compact in its footprint so as to not unduly adversely impact on the limited storage space often available to fishermen.

The fishing hook packaging system of the present invention is comprised of a relatively flat backing member that has a first edge, a front surface and a back surface, and having or a pair of openings. A flexible cover has a second edge that is hingedly attached to the first edge in any appropriate fashion. A flexible and resilient line has a pair of ends and a medial section therebetween such that the two end each pass through the opening or openings of the backing member so as to be located facing the back surface of the backing member with the medial section facing the front surface of the backing member. The medial section articulates between two states, a normally relaxed state wherein the medial section forms a bulbous loop having a first cross section and a flattened state wherein the medial section is flattened and has a second cross section whenever a squeezing force is placed onto the medial section. Whenever the squeezing force is removed from the medial section whenever the medial section is in the flattened state, the medial section resiliently returns to the normally relaxed state. The backing member is made from either card stock or plastic or similar material. The cover may be transparent. The two ends of the line are secured in order to prevent each end from being discharged from the opening or openings. The line is made from either a monofilament material, a shape metal alloy, or braided line or wire. An item, such as a fishing hook, is received on the line such that the eye of the item has a third cross-section that is smaller than the first cross-section (medial section in normally relaxed state) and is greater than the second cross-section (medial section in flattened state).

BRIEF DESCRIPTION OF THE DRAWINGS

Similar reference numerals refer to similar parts throughout the several views of the drawings.

DESCRIPTION OF THE PREFERRED EMBODIMENT

Figure 1:
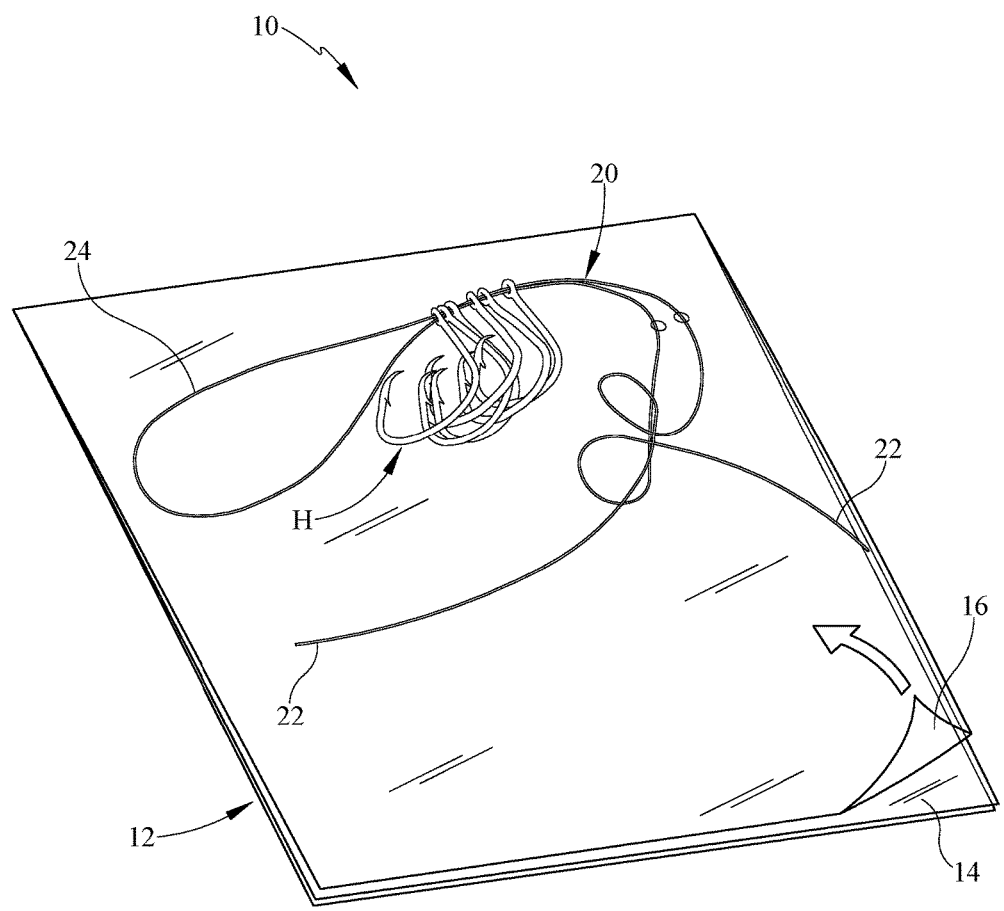
FIG. 1 is perspective view of the fishing hook packaging system of the present invention.
Figure 2:
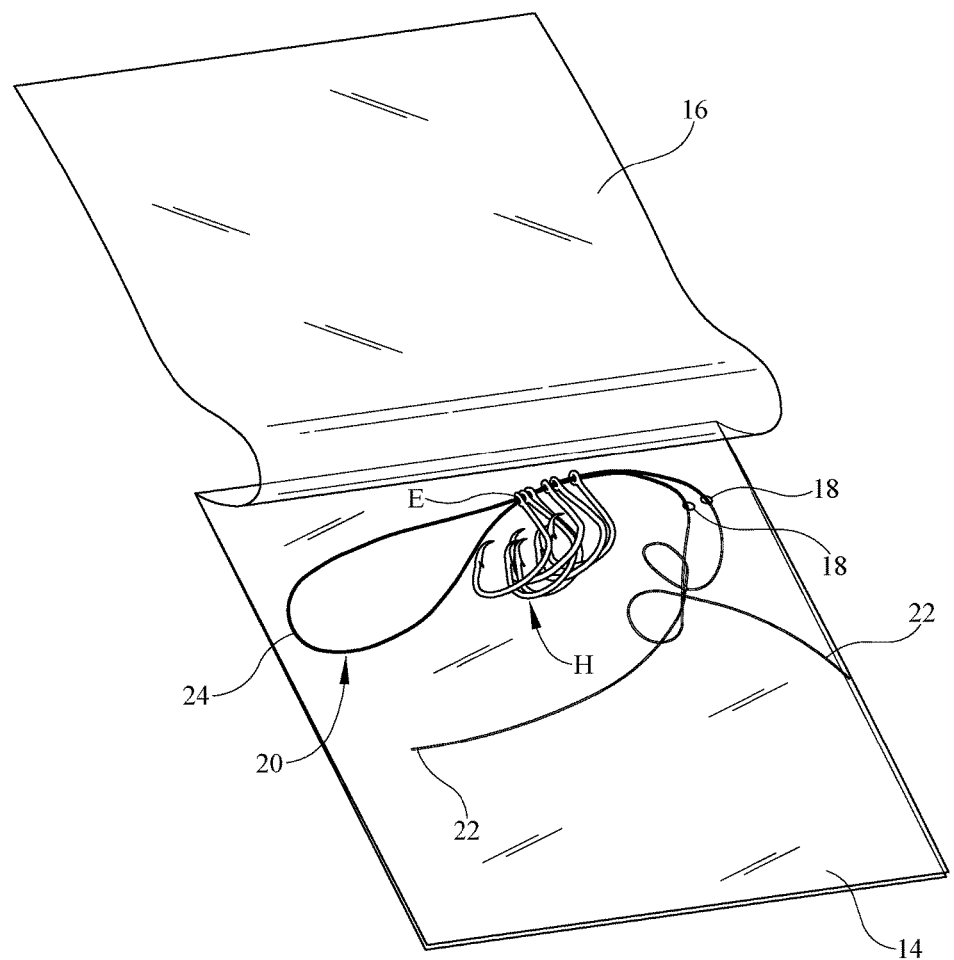
FIG. 2 is a perspective view of the fishing hook packaging system with the protective cover open.
Figure 3:
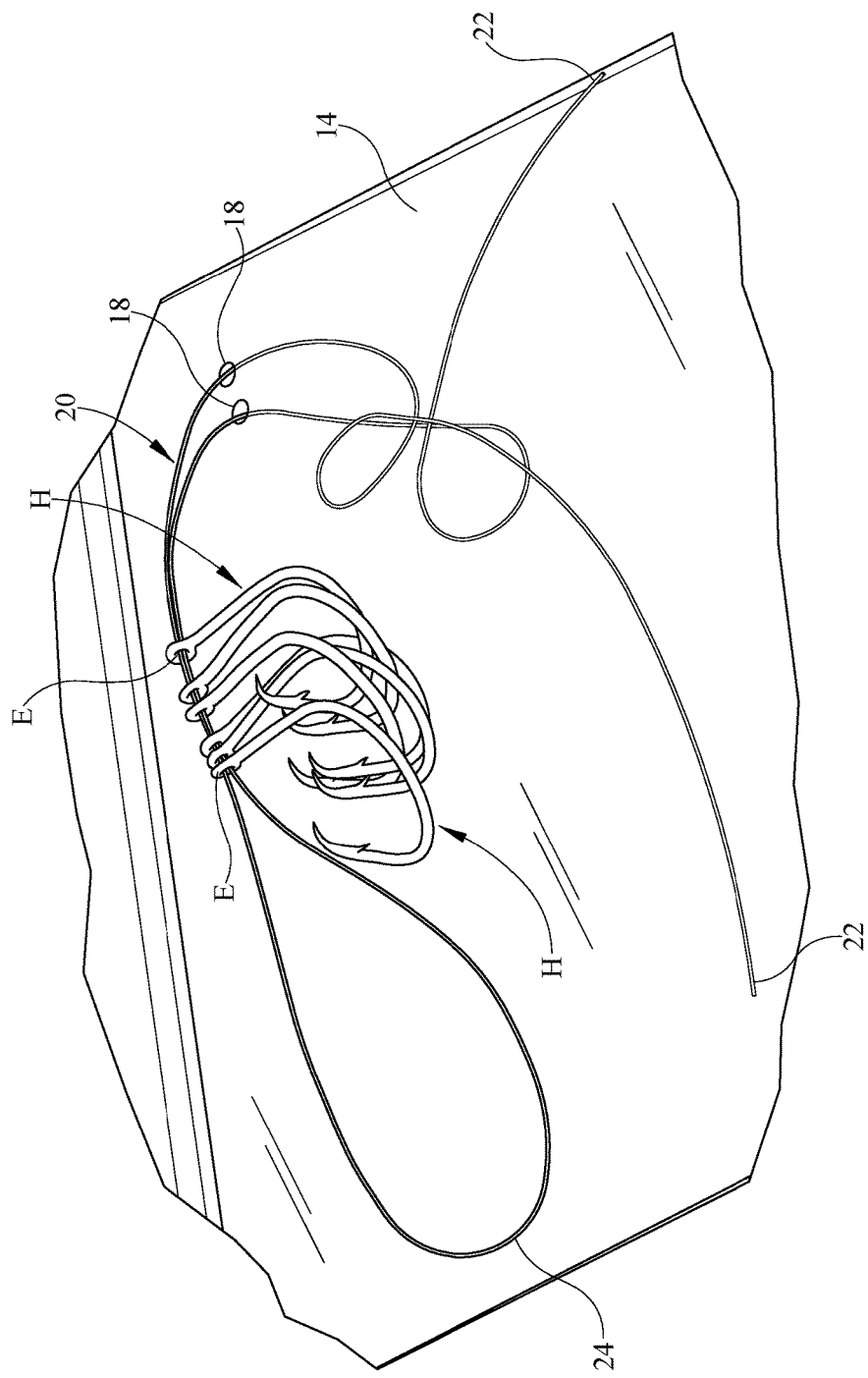
FIG. 3 is a close-up perspective view of the dispensing system of the fishing hook packaging system.

Referring now to the drawings, it is seen that the fishing hook packaging system of the present invention, generally denoted by reference numeral 10, is comprised of a holding system 12 that is comprised of a backing member 14 and a flexible protective cover 16 that is hingedly attached to the backing member 14 along an edge of each respective member. Hinged attachment of the cover 16 to the backing member 14 is in any appropriate fashion such as adhering the cover 16 to the backing member proximate the attachment edges of each, heat welding or ultrasonic welding the backing member 14 with the cover 16 (if the materials used for the backing member 14 and the cover 16 are susceptible to such welding), use of tape (not illustrated), living hinge, etc.

The backing member 14 has either one or a pair of openings 18 extending therethrough. The backing member 14 is made from a relatively sturdy material, such as card stock or plastic for a more durable device. The cover 16 is made from a flexible material, such as cellophane and may be transparent—the backing member 14 can be made from the same or similar material used to make the cover 16.

Figure 4:
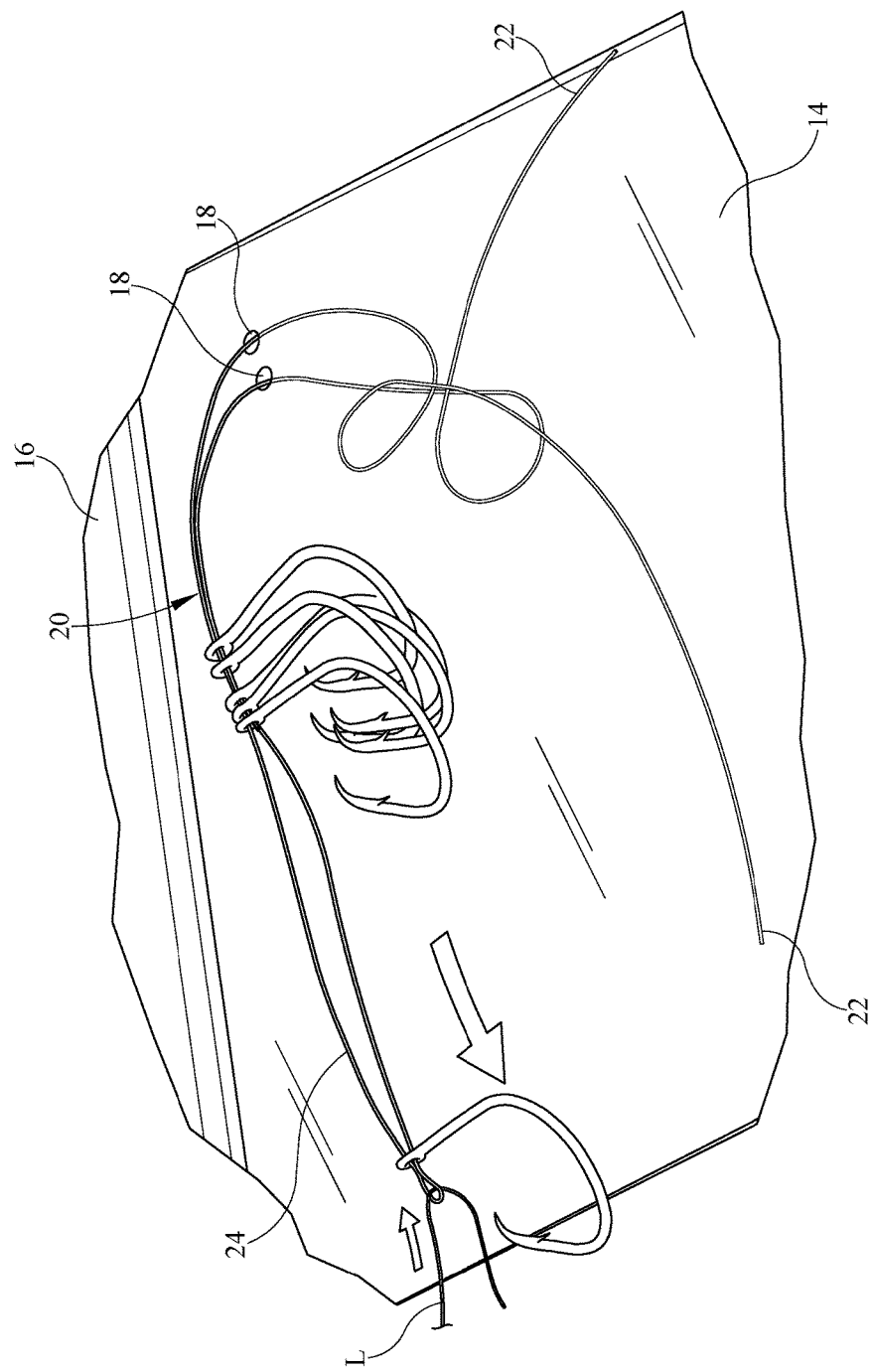
FIG. 4 is a close-up perspective view of the fishing hook packaging system at the commencement of the dispensing process wherein a hook is threaded onto fishing line.

A length of line 20 has a pair of end sections 22 and a medial section 24 such that the end sections 22 each pass through the single opening 18 or each through a respective one of the opening pairs 18 through the backing member 14 and are secured on the back side of the backing member 14 in any appropriate manner such as the illustrated tying of the two end sections 22 together, taping each end section 22 to the backing member 14, knotting each end section 22 so that the knot (not illustrated) does not fit through the opening or openings 18 on the backing member 14, etc. The line 20 is made from a flexible and resilient material, such as monofilament line, spring-shape alloy, braided line or wire, etc., so that the medial section 24 bows out to form a bulbous loop. When this bulbous loop is squeezed together, the bulbous loop flattens out as best seen in FIG. 4. When the flattened bulbous loop is no longer being squeezed, the bulbous loop resiliently returns to its normally relaxed state of being the bulbous loop.

In order to use the fishing hook packaging system 10 of the present invention, one or more hooks H are fed onto the line 20 by squeezing the bulbous loop in order to flatten it out. When the bulbous loop is flattened out, such as via squeezing between a person's fingers, the hooks H are fed onto the line 20 by passing the flattened bulbous loop through the eye E of each hook H. Once all hooks H are fed onto the line 20, the squeezing of the bulbous loop is terminated, and the bulbous loop springs back to its normally relaxed state. The hooks H are now secure on the line 20 and will not come off as the bulbous loop is wider than the opening of the eye E of the hook H. If not already so secured, the line 20 is fed through either the one or the pair of openings 18 and secured to the back side of the backing member 24 as described above. Alternately, the ends 22 of the line 20 can be fed through the eye E of each hook H and thereafter the line 20 is fed through either the one or the pair of openings 18 and secured to the back side of the backing member 24 as described above. If the hook H is slid down toward and onto the bulbous loop, the hook H lacks sufficient mass to squeeze the bulbous loop together a sufficient amount to so flatten out the bulbous loop so as to let the hook H pass over the bulbous loop. However, when a user pulls on the hook H, the user is able to put sufficient pulling force onto the hook H so as to flatten out the bulbous loop to the point that the hook H is able to slide off of the line 20. Once the hook H is removed off of the line 20, the squeezing force is no longer present on the bulbous loop and the bulbous loop returns to its normally relaxed state, preventing the remaining hooks H from coming off of the line 20.

Figure 5:
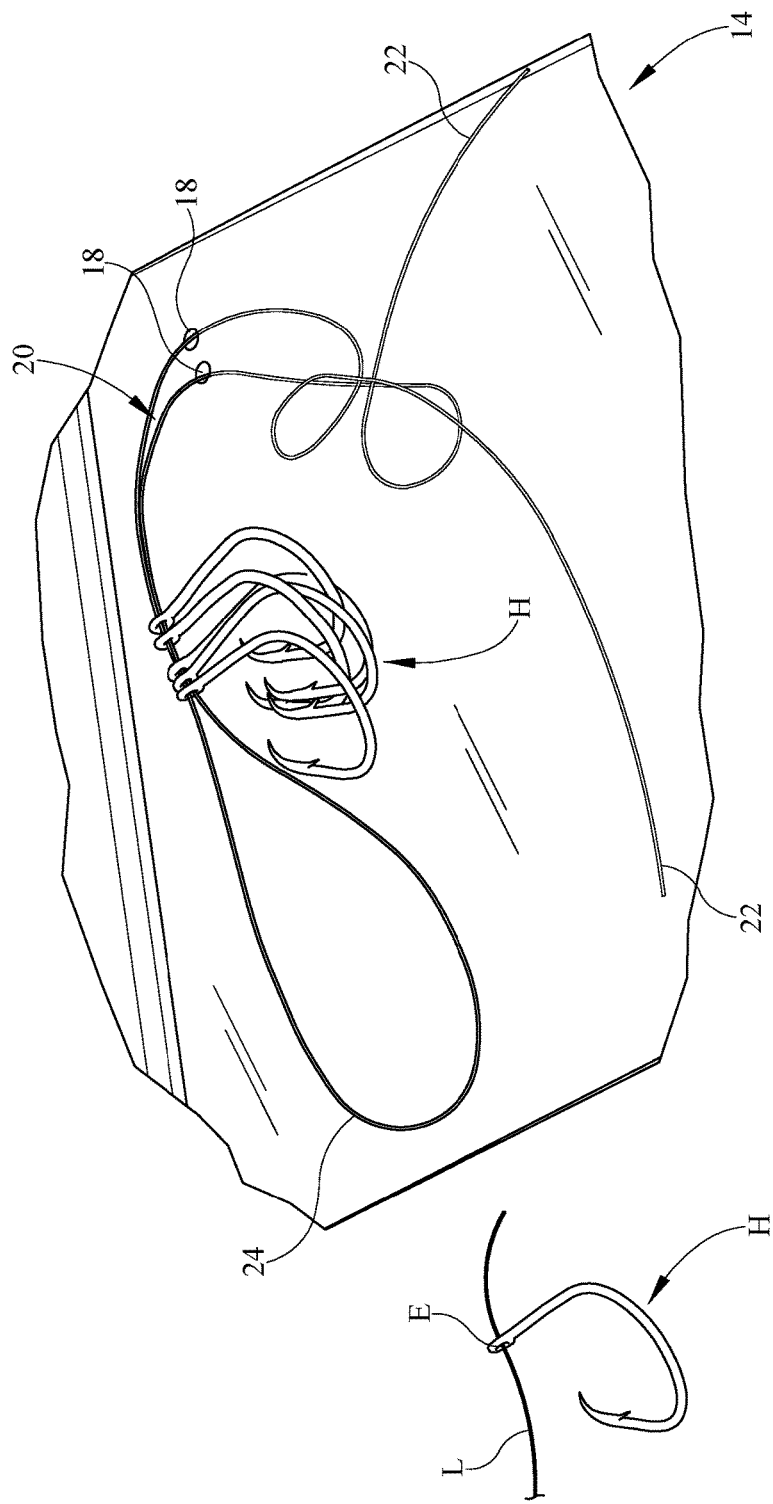
FIG. 5 is a close-up perspective view of the fishing hook packaging system after dispensing of the hook onto the fishing line.

As seen in FIGS. 4 and 5, when the bulbous loop is flattened, the flattened bulbous loop can act as a line guide so that the end of a fishing line L is placed through the flattened bulbous loop which is used as a guide to guide the line L into the eye E of the hook H that is near the distal end of the flattened bulbous loop. When the hook H is fully removed from the bulbous loop, it is already threaded onto the fishing line L, ready for securement thereon.

The holding system 12 allows for simple, compact, and orderly storage of a plurality of fishing hooks H and even with a full complement of hooks H resident on the line 20, the entire device is relatively flat allowing for easy storage with the remainder of the user's items. Initially, all of the edges of the backing member 14 and cover 16 can be attached and when the user initially uses the device, the cover 16 is peeled away from the backing member 14 on all sides except where hinged attachment of the backing member 14 and cover 16 is present, as described previously. If desired, the three peeled back sides of the backing member 14 and cover 16 can have a tack adhesive thereon in order to allow closure of the packaging system 12 after being open.

Of course, the fishing hook packaging system 10 can be used to hold other devices that have eyes including sewing needles, knitting needles, etc.

While the invention has been particularly shown and described with reference to an embodiment thereof, it will be appreciated by those skilled in the art that various changes in form and detail may be made without departing from the spirit and scope of the invention.

I claim:

1. A holder in combination with a fishing hook, the fishing hook having an eye, the holder comprising:
    a relatively flat backing member having a first edge, a front surface and a back surface, and having a pair of openings extending therethrough;
    a flexible cover having a second edge, the second edge attached to the first edge;
    a flexible and resilient line having a pair of end sections and a medial section therebetween such that the pair of end sections each pass through a respective one of the pair of openings in the backing member so as to have respective ends of said pair of ends sections located facing the back surface of the backing member and such that the medial section is facing the front surface of the backing member and such that the medial section is facing the front surface of the backing member and such that the medial section articulates between two states, a normally relaxed state wherein the medial section forms a bulbous loop having a first cross section and a flattened state wherein the medial section is flattened and has a second cross section whenever a squeezing force is placed onto the medial section and such that whenever the squeezing force is removed from the medial section whenever the medial section is in the flattened state, the medial section resiliently returns to the normally relaxed state; and
    wherein the line is threaded through the eye of the hook so that the hook is located along the end sections, both of the end sections simultaneously passing through the eye and such that the eye of the hook has a third cross section that is greater relative to the second cross section and smaller relative to the first cross section such that whenever the medial section is in the relaxed state and forms the bulbous loop, the eye is unable to pass along the bulbous loop and is maintained between the bulbous loop and the backing member and such that whenever the medial section is in the flattened state, the eye slides along the medial section and is unthreaded from the line without passing over either of the ends of the line.

2. The holder as in claim 1 wherein the backing member is made from card stock.

3. The holder as in claim 1 wherein the backing member is made from plastic.

4. The holder as in claim 1 wherein the backing member is made from either card stock or plastic.

5. The holder as in claim 1 wherein the cover is transparent.

6. The holder as in claim 1 wherein the ends of the pair of end sections of the flexible line are secured in order to prevent each of the ends from being discharged from the respective opening of the pair of openings.

7. The holder as in claim 1 wherein the line is made from a monofilament material.

8. The holder as in claim 1 wherein the line is made from a shape metal alloy.

9. The holder as in claim 1 wherein the line is made from a braided wire or line.

10. The holder as in claim 1 wherein the line is made from either a monofilament material or from a shape metal alloy or from a braided wire or line.

11. The holder as in claim 1 wherein the second edge of the cover is hingedly attached to the first edge of the backing member.

* * * * *